United States Patent
Zhang et al.

(10) Patent No.: US 9,515,574 B2
(45) Date of Patent: Dec. 6, 2016

(54) MODULAR EMBEDDED MULTI-LEVEL CONVERTER WITH MIDPOINT BALANCING

(71) Applicant: General Electric Company, Schenectady, NY (US)

(72) Inventors: Di Zhang, Niskayuna, NY (US); Luis Jose Garces, Niskayuna, NY (US); Andrew Allen Rockhill, Mechanicville, NY (US)

(73) Assignee: General Electric Company, Niskayuna, NY (US)

( * ) Notice: Subject to any disclaimer, the term of this patent is extended or adjusted under 35 U.S.C. 154(b) by 127 days.

(21) Appl. No.: 14/543,516

(22) Filed: Nov. 17, 2014

(65) Prior Publication Data
US 2016/0141949 A1  May 19, 2016

(51) Int. Cl.
H02M 7/487 (2007.01)
H02M 7/757 (2006.01)
H02M 7/483 (2007.01)

(52) U.S. Cl.
CPC ........... *H02M 7/487* (2013.01); *H02M 7/7575* (2013.01); *H02M 2007/4835* (2013.01)

(58) Field of Classification Search
CPC .................. H02M 7/487; H02M 7/483; H02M 2007/4835; H02M 7/501; H02M 7/49; H02M 2001/123; H02M 7/505; H02M 7/525
See application file for complete search history.

(56) References Cited

U.S. PATENT DOCUMENTS

| | | |
|---|---|---|
| 2006/0215425 A1 | 9/2006 | Fu et al. |
| 2008/0291708 A1* | 11/2008 | Teichmann ............. H02M 1/32 363/50 |
| 2011/0141786 A1 | 6/2011 | Shen et al. |
| 2014/0092660 A1 | 4/2014 | Zhang et al. |
| 2014/0092661 A1 | 4/2014 | Zhang et al. |

FOREIGN PATENT DOCUMENTS

| | | |
|---|---|---|
| CN | 202856630 U | 4/2013 |
| CN | 103095167 A | 5/2013 |

(Continued)

OTHER PUBLICATIONS

Ceballos, S. et al: "Analysis of Voltage Balancing Limits in Modular Multilevel Converters", IECON 2011—37th Annual Conference on IEEE Industrial Electronics Society, Nov. 7-10, 2011, pp. 4397-4402.

(Continued)

*Primary Examiner* — Harry Behm
(74) *Attorney, Agent, or Firm* — Nitin N. Joshi (57) ABSTRACT

A modular embedded multi-level converter (MEMC) includes a first phase portion and a second phase portion. The first phase portion includes a first switch stack operable to couple a first phase branch between a positive DC bus and a midpoint node. The second phase portion includes a second switch stack operable to couple a second phase branch between the midpoint node and a negative DC bus. A DC voltage between the positive DC bus and the negative DC bus is distributable among switching units disposed in the first phase branch and the second phase branch. A distribution of the DC voltage is controlled by regulating a DC voltage at the midpoint node to balance energy among the switching units.

18 Claims, 5 Drawing Sheets

(56) References Cited

FOREIGN PATENT DOCUMENTS

| | | | |
|---|---|---|---|
| CN | 103701350 | A | 4/2014 |
| EP | 2323249 | A1 | 5/2011 |
| EP | 2725700 | A1 | 4/2014 |
| WO | 2011124260 | A1 | 10/2011 |
| WO | 2014006200 | A1 | 1/2014 |
| WO | 2014023334 | A1 | 2/2014 |
| WO | 2014033155 | A1 | 3/2014 |
| WO | 2014046555 | A1 | 3/2014 |

OTHER PUBLICATIONS

Vasiladiotis, M. et al: "Analysis and Control of Modular Multilevel Converters with Integrated Battery Energy Storage", IEEE Transactions on Power Electronics, vol. 30, No. 1, Jan. 28, 2014, pp. 163-175.

U.S. Appl. No. 14/014,516, filed Aug. 30, 2013, entitled "Method and System for Power Conversion", 32 pages.

European search report and written opinion issued in connection with corresponding EP Application No. 15194431.1 dated Jun. 16, 2016.

\* cited by examiner

MODULAR EMBEDDED MULTI-LEVEL CONVERTER WITH MIDPOINT BALANCING

BACKGROUND

The field of the disclosure relates generally to three-phase power conversion systems and, more particularly, to a modular embedded multi-level converter (MEMC) and a method of use thereof.

Most known multi-level converters have several advantages over ordinary two-level converters, e.g., improved power quality, relatively higher efficiency due to lower switching frequencies, and the ability to interface between a grid and one or more renewable sources, such as photovoltaics (PVs), fuel cells, and wind turbines.

At least some known multi-level converters are configured with a modular structure and without transformers. The modular structure facilitates stacking of such known multi-level converters scaling to various power and voltage levels. Examples of such a multi-level converters include a modular multi-level converter (MMC) and an MEMC. MMCs and MEMCs employ large numbers of fully controllable semiconductor switches, such as insulated gate bipolar transistors (IGBTs), metal oxide semiconductor field effect transistors (MOSFETs), field effect transistors (FETs), gate turn-off thyristors, insulated gate commutated thyristors (IGCTs), injection enhance gate transistors (IEGTs), silicon carbide based switches, gallium nitride based switches, and gallium arsenide based switches, arranged in stacks that variously couple branches to a direct current (DC) side of the multi-level converter.

Energy balancing is an important aspect of operating a multi-level converter. In an MEMC, energy is balanced at a system level, which facilitates equalizing power on the alternating current (AC) side and power on the direct current (DC) side. Energy is further balanced among branches of the MEMC and within the branches. Furthermore, branch energy balancing techniques employed in MMCs, which rely on current distributions among the phase branches coupled in parallel between DC busses, are inapplicable in MEMCs where phase branches are serially coupled between the DC busses.

BRIEF DESCRIPTION

In one aspect, a modular embedded multi-level converter (MEMC) is provided. The MEMC includes a first phase portion and a second phase portion. The first phase portion includes a first switch stack operable to couple a first phase branch between a positive DC bus and a midpoint node. The second phase portion includes a second switch stack operable to couple a second phase branch between the midpoint node and a negative DC bus. A DC voltage between the positive DC bus and the negative DC bus is distributable among switching units disposed in the first phase branch and the second phase branch.

In another aspect, a method of operating an MEMC is provided. The method includes controlling a plurality of switches for the MEMC. When controlled, the plurality of switches couples a first phase branch between a positive DC voltage source and a midpoint node. The plurality of switches also couples a second phase branch between the midpoint node and a negative DC voltage source. The plurality of switches further couples opposing ends of a third phase branch to the midpoint node. The method further includes regulating an AC component of a midpoint voltage at the midpoint node. The AC component of the midpoint voltage is regulated to balance branch energy via AC current loops among the first phase branch, the second phase branch, and the third phase branch. The method also includes regulating a DC component of the midpoint voltage to balance branch energy by controlling DC voltages distributed among the first phase branch and the second phase branch.

In yet another aspect, a power conversion system is provided. The power conversion system includes an MEMC and a controller. The MEMC includes three phase branches corresponding to three phases. The controller is coupled to the MEMC and operable to control a plurality of switches. The plurality of switches is configured to variously couple the three phase branches to a positive DC voltage source, a negative DC voltage source, and a midpoint node. The controller is configured to regulate an AC component of a midpoint voltage and a DC component of the midpoint voltage to balance respective energies in the three phase branches.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Power conversion systems described herein provide a technique for balancing energy among branches of a modular embedded multi-level converter (MEMC). Certain embodiments described herein include a three-phase MEMC having a phase branch corresponding to each of the three phases. The phase branches are variously coupled to a positive direct current (DC) voltage source, a negative DC voltage source, and a midpoint node by corresponding switch stacks. At a given instant, energies in the phase branches are balanced by regulating a DC voltage at the midpoint node rather than by regulating alternating current (AC) loops and DC current through the phase branches, as is done in modular multi-level converters (MMCs).

Figure 1:
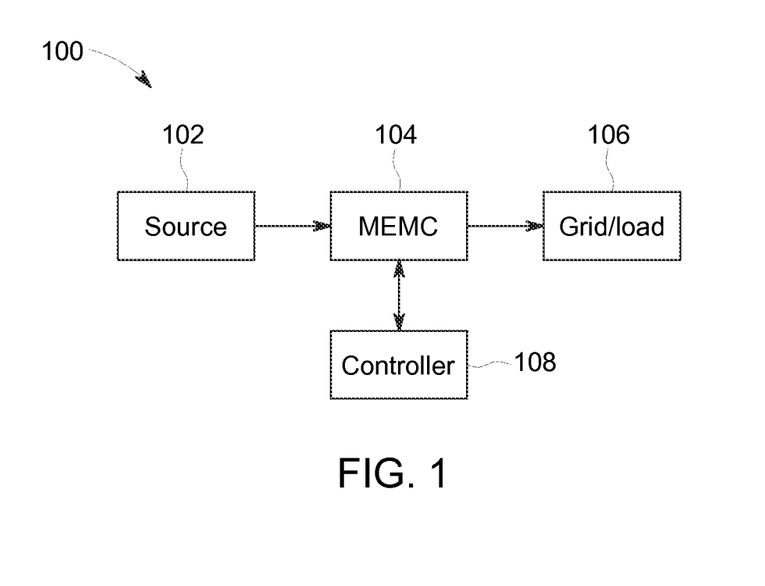
FIG. 1 is a block diagram of an exemplary power conversion system.

FIG. 1 is a block diagram of an exemplary power conversion system 100. Power conversion system 100 includes a source 102, an MEMC 104, a load 106, and a controller 108. Source 102 is a power source. For example, without limitation, source 102 may be a renewable power source, a non-renewable power source, a generator, or a grid. Load 106 is an electrical load. For example, without limitation, load 106 may be an electrical grid or an electrical appliance. Alternative embodiments of power conversion system 100 include additional components, such as, without limitation, circuit breakers, inductors, compensators, capacitors, rectifiers, reactors, and filters.

Controller 108 is coupled to and configured to control operation of MEMC 104. Controller 108 controls MEMC 104 via a plurality of semiconductor switches within MEMC 104.

As used herein, the term "controller" is not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Figure 2:
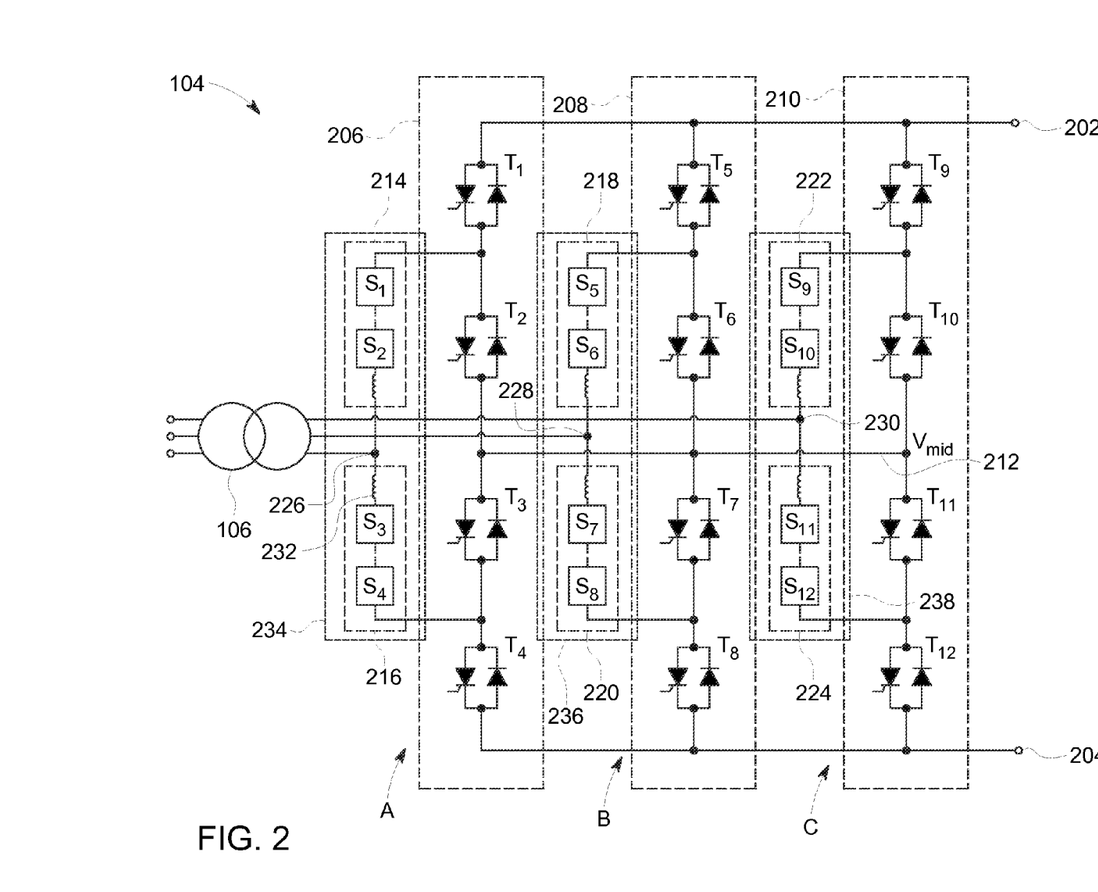
FIG. 2 is a schematic diagram of an exemplary MEMC shown in FIG. 1.

FIG. 2 is a schematic diagram of MEMC 104 shown in FIG. 1. MEMC 104 includes a positive DC voltage source 202 and a negative DC voltage source 204. MEMC 104 also includes a phase A, a phase B, and a phase C, coupled between positive DC voltage source 202 and negative DC voltage source 204. Phase A includes a switch stack 206, phase B includes a switch stack 208, and phase C includes a switch stack 210. Each of switch stacks 206, 208, and 210 includes four switches coupled in series. Switch stack 206 includes a thyristor valve $T_1$, a thyristor valve $T_2$, a thyristor valve $T_3$, and a thyristor valve $T_4$ coupled in series between positive DC voltage source 202 and negative DC voltage source 204. Switch stack 208 includes a thyristor valve $T_5$, a thyristor valve $T_6$, a thyristor valve $T_7$, and a thyristor valve $T_8$ coupled in series between positive DC voltage source 202 and negative DC voltage source 204. Switch stack 210 includes a thyristor valve $T_9$, a thyristor valve $T_{10}$, a thyristor valve $T_{11}$, and a thyristor valve $T_{12}$ coupled in series between positive DC voltage source 202 and negative DC voltage source 204. In alternative embodiments, switches in switch stacks 206, 208, and 210 may be insulated gate bipolar transistors (IGBTs). Respective midpoints of switch stacks 206, 208, and 210 are coupled to a common node referred to as a midpoint node 212.

Phase A includes an upper phase arm 214 and a lower phase arm 216. Phase B includes an upper phase arm 218 and a lower phase arm 220. Phase C includes an upper phase arm 222 and a lower phase arm 224. Upper phase arm 214 and lower phase arm 216 are coupled to a phase A terminal 226. Upper phase arm 218 and lower phase arm 220 are coupled to a phase B terminal 228. Upper phase arm 222 and lower phase arm 224 are coupled to a phase C terminal 230. Terminals 226, 228, and 230, corresponding to phases A, B, and C, couple MEMC 104 to a load or power grid 106.

In general, a phase arm includes one or more switching units coupled in series with an arm inductor to a respective phase terminal. Upper phase arm 214 includes switching units $S_1$ and $S_2$. Lower phase arm 216 includes switching units $S_3$ and $S_4$. Upper phase arm 218 includes switching units $S_5$ and $S_6$. Lower phase arm 220 includes switching units $S_7$ and $S_8$. Upper phase arm 222 includes switching units $S_9$ and $S_{10}$. Lower phase arm 224 includes switching units $S_{11}$ and $S_{12}$. Lower phase arm 216 includes arm inductor 232. Likewise, upper phase arms 214, 218, and 222, and lower phase arms 220 and 224 also include an inductor in their respective topologies. Upper phase arm 214 couples into switch stack 206 between thyristor valves $T_1$ and $T_2$. Likewise, upper phase arm 218 couples into switch stack 208 between thyristor valves $T_5$ and $T_6$, and upper phase arm 222 couples into switch stack 210 between thyristor valves $T_9$ and $T_{10}$. Lower phase arm 216 couples into switch stack 206 between thyristor valves $T_3$ and $T_4$. Likewise, lower phase arm 220 couples into switch stack 208 between thyristor valves $T_7$ and $T_8$, and lower phase arm 224 couples into switch stack 210 between thyristor valves $T_{11}$ and $T_{12}$.

Switching units $S_1$ through $S_{12}$ conduct current in either direction and may be constructed with unidirectional or bidirectional voltage topologies, or a combination of both. One example of a unidirectional voltage topology is a half-bridge topology. One example of a bidirectional voltage topology is a full-bridge topology. Switching units $S_1$ through $S_4$ form a phase branch 234 for phase A. Switching units $S_5$ through $S_8$ form a phase branch 236 for phase B. Switching units $S_9$ through $S_{12}$ form a phase branch 238 for phase C.

During operation, thyristor valves $T_1$ through $T_{12}$ are controlled such that phases A, B, and C are coupled between either positive DC voltage source 202 and midpoint node 212, midpoint node 212 and negative DC voltage source 204, or coupled to midpoint node 212 alone. Switches $S_1$ through $S_{12}$ in switch stacks 206, 208, and 210 are generally controlled by a controller (not shown in FIG. 2), such as, and without limitation, controller 108 shown in FIG. 1, executing a control algorithm.

Figure 3:
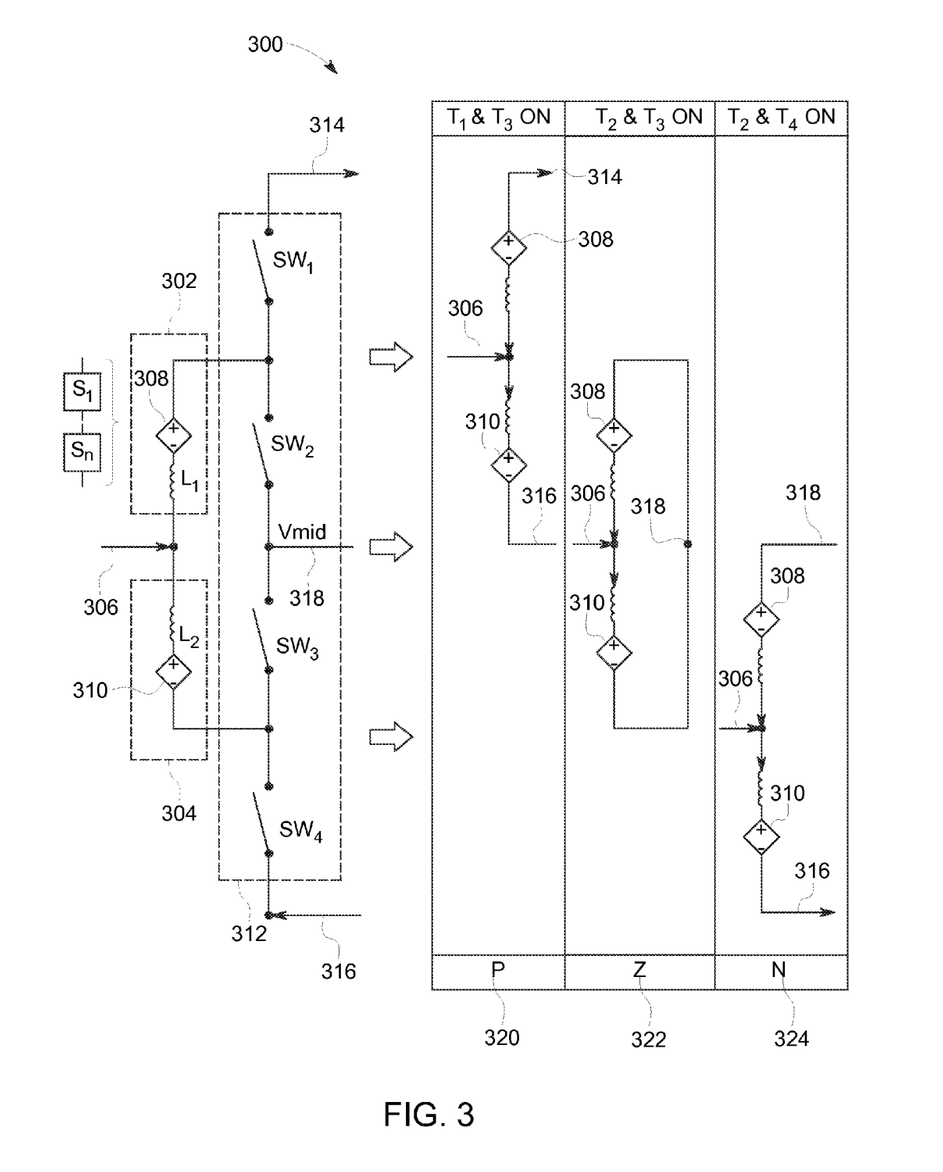
FIG. 3 is a schematic diagram of various states of a phase branch for the exemplary MEMC shown in FIG. 2.

FIG. 3 is a schematic diagram of three possible states for a phase branch 300 in MEMC 104 shown in FIG. 1. Phase branch 300 includes a first phase arm 302 and a second phase arm 304. Each of phase arms 302 and 304 includes one or more switching units $S_1$ through $S_n$ coupled in series with an arm inductor $L_1$ and a phase terminal 306. The series coupled switching units $S_1$ through $S_n$ are represented as a first controlled voltage source 308 and a second controlled voltage source 310. Phase branch 300 is coupled to a switch stack 312 including a switch $SW_1$, a switch $SW_2$, a switch $SW_3$, and a switch $SW_4$ coupled in series between a positive DC bus 314 and a negative DC bus 316. The midpoint of switch stack 312 is coupled to a midpoint node 318.

Phase branch 300 progresses through a positive state 320, a zero state 322, and a negative state 324 during a fundamental cycle. In general, the fundamental cycle for a 60 Hertz system is $\frac{1}{60}^{th}$ of a second. The fundamental cycle for MEMC 104 shown in FIG. 1 includes six sub-cycles. During a given sub-cycle of the fundamental cycle, phase branch 300 can be in one of positive state 320, zero state 322, and negative state 324. When in positive state 320, phase branch 300 is coupled between positive DC bus 314 and midpoint node 318, and conducts a DC current through first controlled voltage source 308 and second controlled voltage source 310. To achieve positive state 320, switch $SW_1$ and switch $SW_3$ are closed, and switch $SW_2$ and switch $SW_4$ are open. When in zero state 322, phase branch 300 is coupled to midpoint node 318 alone, i.e., both first phase arm 302 and second phase arm 304 are coupled to midpoint node 318, which is achieved by opening switch $SW_1$ and switch $SW_4$, and closing switch $SW_2$ and switch $SW_3$. While in zero state 322, phase branch 300 conducts AC phase currents. When in negative state 324, phase branch 300 is coupled between midpoint node 318 and negative DC bus 316, and conducts the DC current through first controlled voltage source 308 and second controlled voltage source 310. To achieve negative state 324, switch $SW_2$ and switch $SW_4$ are closed, and switch $SW_1$ and switch $SW_3$ are open.

For a three phase system, it is necessary, to support the full DC bus voltage, that at least one phase branch be in positive state 320 and at least one other phase branch be in negative state 324 at a given time. Each phase branch transitions from positive state 320, through zero state 322, and to negative state 324, or from negative state 324, to zero state 322, to positive state 320. While a given phase branch is in transition, the other two phase branches are in positive state 320 and negative state 324 to support the DC bus voltage.

Figure 4:
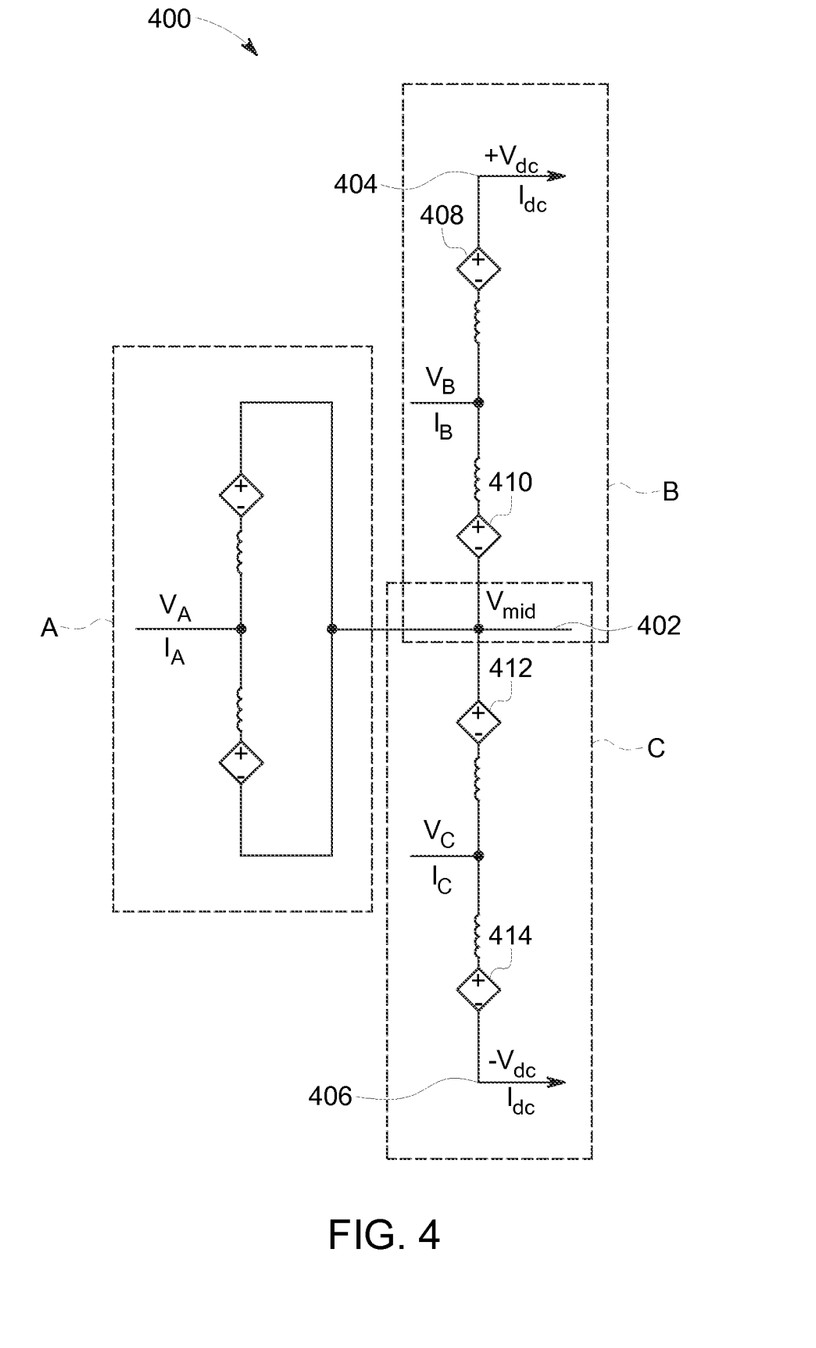
FIG. 4 is a schematic diagram of an equivalent circuit for the exemplary MEMC shown in FIG. 2.

FIG. 4 is a schematic diagram of an equivalent circuit 400 for a given sub-cycle of a fundamental cycle for MEMC 104. Equivalent circuit 400 includes a phase branch A, a phase branch B, and a phase branch C. Phase branch A is in a zero state, coupled to a midpoint node 402. Phase branch A does not conduct DC current, but does conduct AC current among phases A, B, and C. Phase branch B is in a positive state, coupled between a positive DC bus 404 and midpoint node 402. Phase branch B conducts both a DC current, $I_{dc}$, and an AC current flowing in an AC current loop between phase A and phase B. Phase branch B includes an upper controlled voltage source 408 and a lower controlled voltage source 410. An AC current between phases A and B passes through phase branch A and through lower controlled voltage source 410 in phase branch B. Likewise, phase branch C includes an upper controlled voltage source 412 and a lower controlled voltage source 414, and conducts the DC current, $I_{dc}$, and AC current flowing in an AC current loop between phases A and C. An AC current between phases A and C passes through phase branch A and through upper controlled voltage source 412 in phase branch C.

DC current, $I_{dc}$, flows from positive DC bus 404 to negative DC bus 406, and passes through each switching unit in phase branch B and phase branch C. The DC current is decoupled from AC current loops among phases A, B, and C. The AC currents and, consequently, phase energies received from or sent to the AC side are balanced by regulating an AC voltage at midpoint node 402, i.e., an AC component of a midpoint voltage. The regulation of the AC voltage at midpoint node 402 is achieved by adding a common mode voltage to each phase.

Phase branch energies are further balanced by regulating a DC voltage at midpoint node 402, i.e., a DC component of the midpoint voltage. The DC voltage between positive DC bus 404 and negative DC bus 406 is distributed across phase branch B and phase branch C by controlling voltages across the various switching units in phase branch B and phase branch C, i.e., upper controlled voltage source 408, lower controlled voltage source 410, upper controlled voltage source 412, and lower controlled voltage source 414. Controlled voltage sources 410 and 412, through which AC current loops pass, are held at a steady voltage once phase energies on the AC side are balanced.

Figure 5:
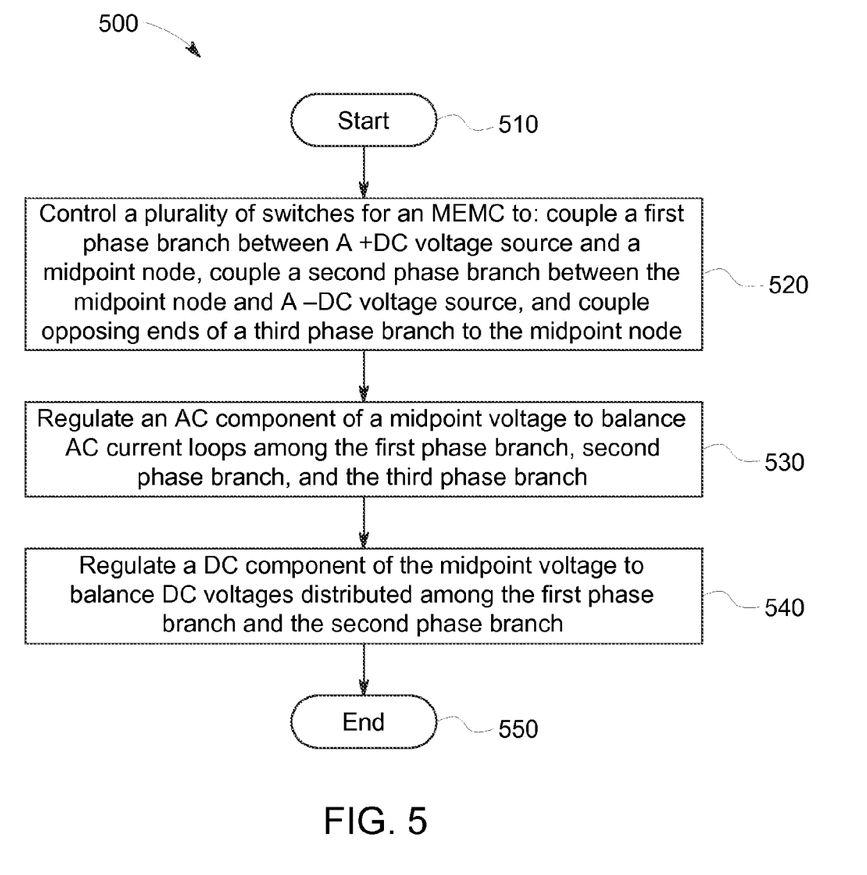
FIG. 5 is a flow diagram of an exemplary method of operating a three-phase power converter.

FIG. 5 is a flow diagram of an exemplary method 500 of operating MEMC 104 (shown in FIGS. 1 and 2). The method begins at a start step 510. At a controlling step 520, plurality of switches $T_1$ through $T_{12}$ (shown in FIG. 2) for MEMC 104 is controlled according to a power conversion switching algorithm. The plurality of switches $T_1$ through $T_{12}$ are arranged in switch stacks 206, 208, and 210 (shown in FIG. 2). Switch stacks 206, 208, and 210 are configured to variously couple phase branches 234, 236, and 238 (all shown in FIG. 2) to positive DC voltage source 202, negative DC voltage source 204, and midpoint node 212 (all shown in FIG. 2).

At a given instant, at least one phase branch, of phase branches 234, 236, and 238, must be in positive state 320 (shown in FIG. 3) and at least one other phase branch must be in negative state 224 (shown in FIG. 3). While one phase branch is in positive state 320 and another is in negative state 324, the third phase branch can transition from positive state 320, to zero state 322 (shown in FIG. 3) and on to negative state 324, or from negative state 324, to zero state 322, and on to positive state 320. For a given fundamental cycle, each of the three phase branches passes through each of the three states: positive state 320, zero state 322, and negative state 324.

For a given sub-cycle in a given fundamental cycle, at controlling step 520, the plurality of switches $T_1$ through $T_{12}$ are controlled to couple phase branch 234 between positive DC voltage source 202 and midpoint node 212, and couple phase branch 236 between midpoint node 212 and negative DC voltage source 204. The plurality of switches $T_1$ through $T_{12}$ are further controlled to couple phase branch 238 to midpoint node 212 alone, which is to couple opposing ends of phase branch 238 to midpoint node 212. Consequently, during the given sub-cycle, phase branch 234 is in positive state 320, phase branch 236 is in negative state 324, and phase branch 238 is in zero state 322. Also during the given sub-cycle, phase branch 234 and phase branch 236 support the full DC voltage between positive DC voltage source 202 and negative DC voltage source 204.

At an AC balancing step 530, an AC component of a midpoint voltage is regulated to balance AC current loops among phase branch 234, phase branch 236, and phase branch 238. The AC component of the midpoint voltage is regulated by adding a common mode voltage to each of phases A, B, and C (shown in FIG. 2) thus balancing the energy among phases A, B, and C.

At a DC balancing step 540, a DC component of the midpoint voltage is regulated to balance DC voltages distributed among phase branch 234 and phase branch 236.

Voltages across the various switching units $S_1$ through $S_8$ (all shown in FIG. 2) in phase branch 234 and phase branch 236 are regulated such that voltages for switching units $S_3$, $S_4$, $S_5$, and $S_6$, which carry AC currents and were previously balanced in AC balancing step 530 are held constant, while DC voltages across switching units $S_1$, $S_2$, $S_7$, and $S_8$, which do not carry AC currents, are adjusted to balance energy across upper and lower phase arms 214, 216, 218, and 220 (all shown in FIG. 2) of each of phase branches 234 and 236. The method ends at an end step 550.

The above described power conversion systems provide a technique for balancing energy among branches of a modular embedded multi-level converter (MEMC). Certain embodiments described herein include a three-phase MEMC having a phase branch corresponding to each of the three phases. The phase branches are variously coupled to a positive direct current (DC) voltage source, a negative DC voltage source, and a midpoint node by corresponding switch stacks. At a given instant, energies in the phase branches are balanced by regulating a DC voltage at the midpoint node rather than by regulating alternating current (AC) loops and DC current through the phase branches, as is done in modular multi-level converters (MMCs). Furthermore, branch energy balancing techniques employed in MMCs, which rely on current distributions among the phase branches coupled in parallel between DC busses, are inapplicable in MEMCs where phase branches are serially coupled between the DC busses.

An exemplary technical effect of the methods, systems, and apparatus described herein includes at least phase branch energy balancing in a three-phase MEMC topology that is decoupled from AC current loops.

Exemplary embodiments of methods, systems, and apparatus for three phase power conversion are not limited to the specific embodiments described herein, but rather, components of systems and/or steps of the methods may be utilized independently and separately from other components and/or steps described herein. For example, the methods may also be used in combination with other non-conventional power conversion, and are not limited to practice with only the systems and methods as described herein. Rather, the exemplary embodiment can be implemented and utilized in connection with many other applications, equipment, and systems that may benefit from phase branch energy balancing.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A modular embedded multi-level converter (MEMC) comprising:

a first phase portion comprising a first switch stack and a first phase branch, wherein said first switch stack is configured to couple said first phase branch between a positive direct current (DC) bus and a midpoint node;

a second phase portion comprising a second switch stack and a second phase branch, wherein said second switch stack is configured to couple said second phase branch between said midpoint node and a negative DC bus, wherein a DC voltage between said positive DC bus and said negative DC bus is distributable among switching units disposed in said first phase branch and said second phase branch, and wherein a distribution of said DC voltage is controlled by regulating a DC voltage at said midpoint node to balance energy among said switching units;

a third phase portion comprising a third switch stack and a third phase branch, wherein said third switch stack is configured to couple opposing ends of said third phase branch to said midpoint node; and wherein said first switch stack in combination with said third switch stack is configured to form an alternating current (AC) loop among said first phase branch and said third phase branch.

2. The MEMC in accordance with claim 1, wherein alternating current (AC) for said first phase portion, said second phase portion, and said third phase portion are decoupled from DC flowing through said first phase branch and said second phase branch.

3. The MEMC in accordance with claim 1, wherein said second switch stack in combination with said third switch stack is configured to define an alternating current (AC) loop among said second phase branch and said third phase branch.

4. The MEMC in accordance with claim 1, wherein said first switch stack and said second switch stack are controllable by a power conversion controller.

5. The MEMC in accordance with claim 1, wherein said first switch stack is further configured to later couple said first phase branch between said midpoint node and said negative DC bus.

6. A method of operating a modular embedded multi-level converter (MEMC), said method comprising:
controlling a plurality of switches for the MEMC to:
couple a first phase branch between a positive DC voltage source and a midpoint node;
couple a second phase branch between the midpoint node and a negative DC voltage source; and
couple opposing ends of a third phase branch to the midpoint node;
regulating an AC component of a midpoint voltage, at the midpoint node, to balance AC current loops among the first phase branch, second phase branch, and the third phase branch;
regulating a DC component of the midpoint voltage to balance DC voltages distributed among the first phase branch and the second phase branch;
wherein each of the phase branched comprises an upper phase arm and a lower phase arm coupled to a phase terminal; and
wherein:
said upper phase arm comprises an upper-arm inductor serially coupled between at least one switching unit and said phase terminal; and
said lower phase arm comprises a lower-arm inductor serially coupled between at least one other switching unit and said phase terminal.

7. The method in accordance with claim 6, wherein regulating an AC component of the midpoint voltage comprises applying a common mode voltage at the midpoint node.

8. The method in accordance with claim 6, wherein controlling the plurality of switches comprises commutating a plurality of thyristors.

9. The method in accordance with claim 6, wherein regulating the DC component comprises regulating switching unit voltages in the first phase branch and the second phase branch.

10. The method in accordance with claim 9, wherein regulating the DC component further comprises:
 regulating a voltage for at least one switching unit, in the first phase branch, coupled between the positive DC voltage source and a first phase terminal; and
 regulating another voltage for at least one other switching unit, in the second phase branch, coupled between the negative DC voltage source and a second phase terminal.

11. The method in accordance with claim 9, wherein regulating the DC component further comprises:
 maintaining a voltage for at least one switching unit, in the first phase branch, coupled between a first phase terminal and the midpoint node; and
 maintaining another voltage for at least one other switching unit, in the second phase branch, coupled between a second phase terminal and the midpoint node.

12. The method in accordance with claim 6 further comprising later controlling the plurality of switches to:
 couple the second phase branch between the positive DC voltage source and the midpoint node;
 couple the first phase branch between the midpoint node and the negative DC voltage source; and
 couple the opposing ends of the third phase branch to the midpoint node.

13. A power conversion system comprising:
 a modular embedded multi-level converter (MEMC) having three phase branches corresponding to three phases;
 a controller coupled to said MEMC and operable to control a plurality of switches configured to variously couple said three phase branches to a positive direct current (DC) voltage source, a negative DC voltage source, and a midpoint node, wherein said controller is configured to regulate an alternating current (AC) component of a midpoint voltage and a DC component of said midpoint voltage to balance respective energies in said three phase branches;
 wherein each of said three phase branches comprises an upper phase arm and a lower phase arm coupled to a phase terminal; and
 wherein:
 said upper phase arm comprises an upper-arm inductor serially coupled between at least one switching unit and said phase terminal; and
 said lower phase arm comprises a lower-arm inductor serially coupled between at least one other switching unit and said phase terminal.

14. The power conversion system in accordance with claim 13, wherein said controller is further configured to add a common mode voltage to said three phases by regulating said AC component of said midpoint voltage, wherein said common mode voltage is computed to balance AC current loops among said three phases.

15. The power conversion system in accordance with claim 13, wherein, during a given sub-cycle in a given fundamental cycle:
 a first phase branch of said three phase branches is configured to conduct a DC current from said DC positive voltage source to said midpoint node; and
 a second phase branch of said three phase branches is configured to conduct said DC current from said midpoint node to said DC negative voltage source.

16. The power conversion system in accordance with claim 15, wherein said controller is further configured, given said DC current, to regulate said DC component of said midpoint voltage to balance said respective energies in said first phase branch and said second phase branch.

17. The power conversion system in accordance with claim 16, wherein said controller is further configured, by regulating said DC component, to maintain voltages across respective switching units, of said three phase branches, that conduct AC currents for said three phases.

18. The power conversion system in accordance with claim 15, wherein a third phase branch of said three phase branches is configured to conduct AC currents for said three phases.

* * * * *

UNITED STATES PATENT AND TRADEMARK OFFICE
CERTIFICATE OF CORRECTION

PATENT NO. : 9,515,574 B2  
APPLICATION NO. : 14/543516  
DATED : December 6, 2016  
INVENTOR(S) : Zhang et al.

Page 1 of 1

It is certified that error appears in the above-identified patent and that said Letters Patent is hereby corrected as shown below:

In the Specification

In Column 1, Line 27, delete "insulated gate commutated thyristors (IGCTs)," and insert -- integrated gate commutated thyristors (IGCTs), --, therefor.

In Column 6, Line 34, delete "negative state 224" and insert -- negative state 324 --, therefor.

In the Claims

In Column 8, Line 58, in Claim 6, delete "branched" and insert -- branches --, therefor.

Signed and Sealed this  
Eighteenth Day of April, 2017

Michelle K. Lee  
*Director of the United States Patent and Trademark Office*